United States Patent [19]

Ng

[11] Patent Number: 5,174,398
[45] Date of Patent: Dec. 29, 1992

[54] MULTIMODE POSTAGE SCALE

[75] Inventor: Richard K. Ng, Fremont, Calif.

[73] Assignee: f.m.e. Corporation, Hayward, Calif.

[21] Appl. No.: 640,671

[22] Filed: Jan. 14, 1991

[51] Int. Cl.⁵ .................. G01G 19/40; G01G 23/14
[52] U.S. Cl. .................. 177/1; 177/25.15; 177/164
[58] Field of Search ............ 177/1, 25.15, 164

[56] References Cited

U.S. PATENT DOCUMENTS

| | | |
|---|---|---|
| 1,101,390 | 6/1914 | Benton . |
| 1,392,827 | 10/1921 | Hem . |
| 3,279,552 | 10/1966 | Southall . |
| 3,530,949 | 9/1970 | Swersey et al. . |
| 4,063,604 | 12/1977 | Rock .................. 177/25.15 |
| 4,325,440 | 4/1982 | Crowley et al. . |
| 4,328,875 | 5/1982 | Lechner . |
| 4,417,632 | 11/1983 | Lohberg . |
| 4,484,307 | 11/1984 | Quatse et al. . |
| 4,627,505 | 12/1986 | Kunz . |
| 4,644,142 | 2/1987 | Payn . |
| 4,690,230 | 9/1987 | Uchimura et al. .......... 177/211 X |
| 4,742,469 | 5/1988 | Haines et al. . |
| 4,849,918 | 7/1989 | Feinland .............. 177/25.15 X |
| 4,864,521 | 9/1989 | Feinland .............. 177/25.15 X |
| 4,875,534 | 10/1989 | Kunz . |

*Primary Examiner*—George H. Miller, Jr.
*Attorney, Agent, or Firm*—Townsend and Townsend

[57] ABSTRACT

A postage scale (1) and method of operation. The scale has two or more modes ($M_1$, $M_2$, $M_3$) of operation. In a first mode the scale outputs the weight of an item to within a first, coarse increment. In a second mode ($M_2$), the scale outputs the weight of an item to within a second, fine increment. In one embodiment, a third mode ($M_3$) is selected with a coarse increment depending on the type of carrier and item weight.

20 Claims, 3 Drawing Sheets

MULTIMODE POSTAGE SCALE

BACKGROUND OF THE INVENTION

The present invention relates to the field of postage scales. More specifically, in one embodiment the invention provides an improved postage scale with variable modes of operation.

Postage scales and meters are commonplace in mail rooms everywhere. Such postage systems have become ever more sophisticated in their ability to provide a large variety of services to a user. For example, many postage systems today weigh an article, provide a user with a selection of postage options (such as first class, express mail, and the like). The user selects the desired mail service from the various options. The user then selects from optional services (registered mail and the like) and enters the destination of the item via a zip or zone code. From the above information the postage scale indicates the postage amount needed and/or issues postage for the required amount. U.S. Pat. Nos. 4,484,307 (Quatse et al.), 4,644,142 (Payn), and 4,742,469 (Haines) (all assigned to the assignee of the present invention) disclose postage systems with representative features and are incorporated herein by reference for all purposes.

While meeting with substantial success, prior postage systems have also met with certain limitations. For example, in many applications it is desirable that a postage scale weigh a package quickly and indicate the weight to the user in only a coarse scale. For example, a particular user may wish to have a particular package weighed only in 0.5 ounce increments. In some cases a postage scale may be able to weigh the package more quickly to this degree of accuracy, although it may occasionally result in the application of slightly more than the required amount of postage.

In some cases, however, a user may need to weigh a package to a finer scale or a coarser scale. For example, when a user is using a scale for over-the-counter transactions, the user must meet NTEP (National Type Evaluation Program) requirements as described in NTEP Handbook 94, which is incorporated herein by reference.

It has been exceedingly difficult in many prior postage scales to switch from one mode of weighing an article to another. Many postage scales have not provided for such changes, or have permitted such changes only by way of substantial or complete hardware or software changes within the scale itself.

SUMMARY OF THE INVENTION

The present invention provides an improved postage scale system with multiple modes. A user selects between these modes by pressing a button or other suitable interface on the scale. In a first mode, the scale outputs the weight only to a first, coarse scale. In a second mode the weight is output in a second, finer scale. The second, finer scale indicates the weight to within a smaller variation in weight than the first, coarser scale. For example, in the first mode the scale may indicate the weight in 0.5 ounce increments, while in the second mode the scale may indicate the weight in 0.1 ounce increments.

Accordingly, in one embodiment the invention provides a system for determining the weight of an article to be mailed. The system includes a scale and processing means connected to an output of the scale, the processing means having at least a first mode and a second mode of operation selectable by a user, the processing means having a coarse output precision based on the output of the scale in the first mode and a fine output precision based o the output of the scale in the second mode, the output of the processing means indicating the weight of an article to be mailed.

A further understanding of the nature and advantages of the inventions herein may be realized by reference to the remaining portions of the specification and the attached drawings.

DESCRIPTION OF THE PREFERRED EMBODIMENTS

Contents

I. Hardware Description
II. Software Description
III. Conclusion

I. Hardware Description

Figure 1:
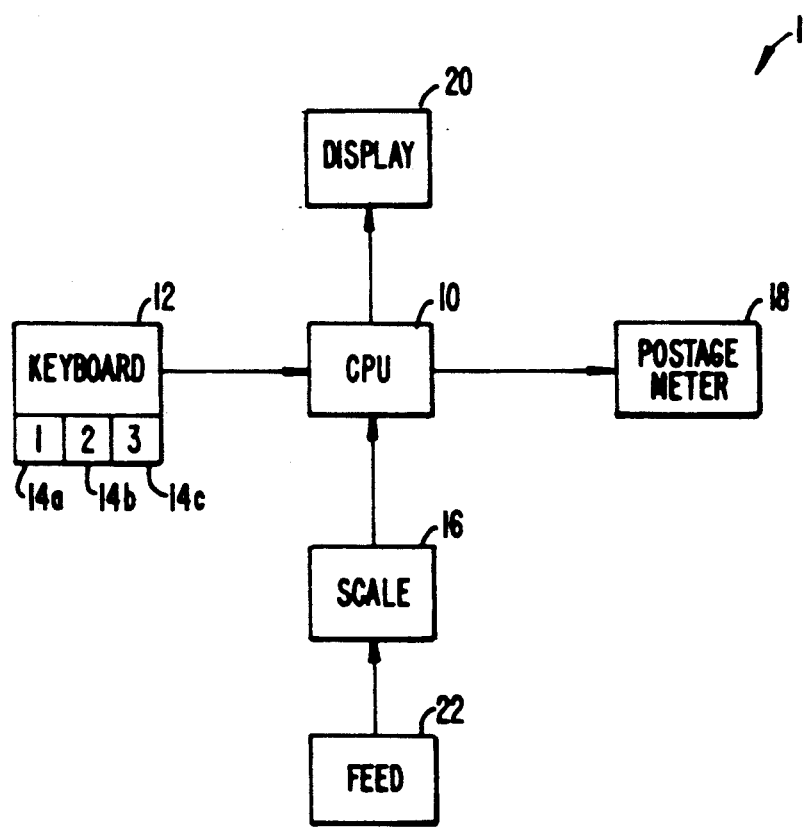
FIG. 1 is an overall block diagram illustrating the hardware components of the system disclosed herein.

FIG. 1 illustrates the hardware components of the postage scale system 1 disclosed herein The system operates under the direction of a CPU 10 which may be, for example, discrete logic or one or more microprocessors known to those of skill in the art such as a model no. 8088 made by Intel. The invention is illustrated herein primarily with reference to a single CPU 10, but the invention could readily be carried out using multiple logic devices within multiple components of the system. For example, a portion of the function herein may be conducted in the scale or postage meter. Alternatively, discrete logic may be used to perform all or part of the functionality herein.

A user interfaces with the CPU via a keyboard or other input device 12. The invention is illustrated with regard to the use of discrete keys for selection of modes, but it will be understood that a variety of input systems could be utilized. For example, the system could obtain input from a video display and mouse, or a generic keypad such as that described in application Ser. No. 07/641,421, filed on Jan. 14, 1991, assigned to the assignee of the present invention and incorporated herein by reference for all purposes. The keypad includes mode selection keys 14a, 14b, and 14c. FIG. 1 illustrates three mode selection keys, but the present invention is applicable to systems with more or fewer modes for selection.

The CPU 10 also receives input from scale 16. The input to CPU 10 from the scale 16 will generally be a digital representation of the weight on the scale. This value will often fluctuate rapidly when the user places an article on the scale, but the value will generally settle to some relatively constant value after a time. The system feeds articles to the scale automatically in some embodiments using an automatic feeding system 22, although in some embodiments a user feeds the scale manually. In one preferred embodiment, the user selects between a manual feed and an automatic feed mode.

Based on selections made by the user at the keyboard 12 and input from the scale 16, the CPU provides output to a display 20 and, optionally, to postage meter 18 for issuance of postage. The form of the output will vary widely from one application to another. For example, the output may take the form of a binary representation of the weight on a series of data pins in the CPU. The specific value of the output from the CPU will vary depending upon the mode selected by the user. In one embodiment the user selects between a first mode and a second mode.

In the first mode (sometimes referred to herein as the "shipping mode") the output from the CPU is coarse. As used herein, the term coarse refers to operations in which the scale determines the weight of the article to within a variation in weight which is relatively less precise than a second mode. In the second mode (sometimes referred to herein as the "commercial mode"), the system determines the weight of the article to within a variation in weight which is fine. As used herein the term fine means relatively more precise weight output than the first mode. For example, in the first (coarse) mode the scale may output weight in 0.5 ounce increments while in the second (fine) mode the weight is output in 0.1 ounce increments.

According to further embodiments, the system outputs a weight in which the coarseness or fineness of the output depends on the weight of the article on the scale. In most embodiments, the output of the scale is relatively more coarse when the article on the scale is relatively heavy, and the output of the scale is relatively more fine when the article is relatively light. For example, in one embodiment, the first mode of operation outputs the weight in 0.5 ounce increments if the article weighs less than 5 pounds, but outputs the weight in 1 ounce increments if the weight of the article is greater than 5 pounds. The second mode of operation outputs the weight of the article in 0.1 ounce increments if the article weighs less than 5 pounds, and outputs the weight in 0.5 ounce increments if the article weighs more than 5 pounds. Accordingly, one mode of operation will meet the standards set forth by an agency such as NTEP, while another mode of operation outputs information much less precisely.

Table 1 summarizes the output of the scale according to one preferred embodiment based on weight and mode of operation.

TABLE 1

Output Parameters Based on Mode and Weight

| Weight | Mode | |
|---|---|---|
| | Fine (commercial) | Coarse (shipping) |
| Less than 5 lbs | 0.1 ounce increments | 0.5 ounce increments |
| Greater than 5 lbs | 0.5 ounce increments | 1 ounce increments |

According to still further embodiments, the scale has a third mode of operation. The user selects the third mode of operation (referred to herein as the fast weighing mode) by pressing the third mode selection key 14c. In alternative embodiments, the system selects the fast weighing mode automatically when the automatic feed is activated.

When an item is placed on the scale, the output from the scale will generally fluctuate for some time. This problem is of particular concern in automatic weighing operations. In the fast weighing mode, the CPU monitors the weight output by the scale many times per second. The CPU selects the weight when the maximum and minimum fluctuations meet some tolerance limit (e.g., ±1 oz). The tolerance limit varies depending on the weight range and type of carrier in preferred embodiments. Table 2 provides illustrative tolerances for various weights/carriers which are used in one specific embodiment. Furthermore, in the fast weighing mode the scale is set to a relatively more coarse display increment. Therefore, in automatic weighing operations, the weight indicated by the scale need not stabilize to within a narrow increment before the weight is output and, therefore, the scale weighs articles more quickly.

TABLE 2

Fast Weighing Algorithm Mode

| | Carrier | |
|---|---|---|
| Weight | UPS, RPS, Federal Express, DHL, USPS | Other Carrier |
| Less than 5 lbs | ±1 ounce tolerance | ±5 ounce tolerance |
| Greater than 5 lbs | ±5 ounce tolerance | ±10 ounce tolerance |

II. Software Description

Figures 2, 2A:
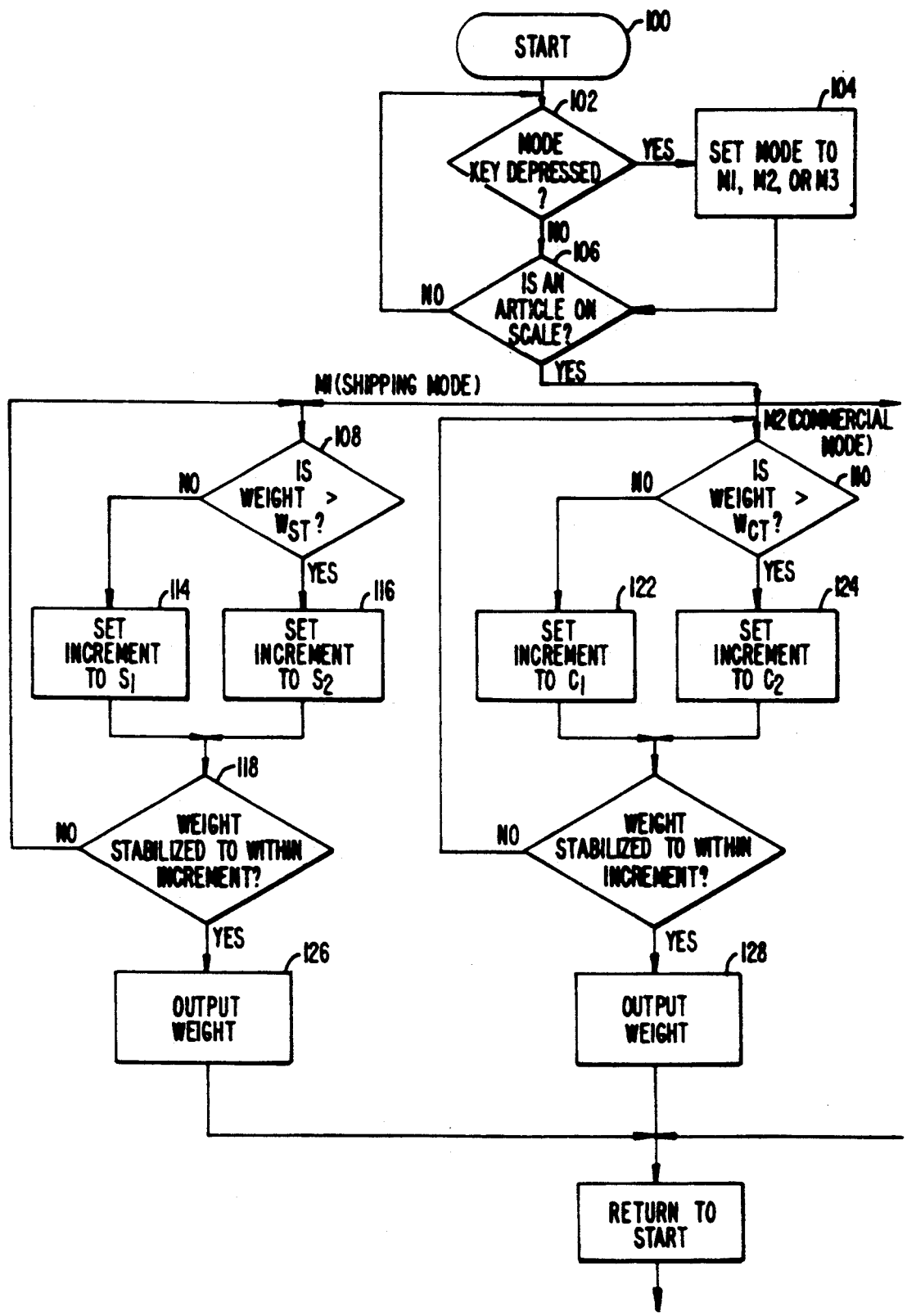
FIGS. 2A and 2B comprise FIG. 2 which is an overall block diagram illustrating the operation of the software utilized herein.
Figure 2B:
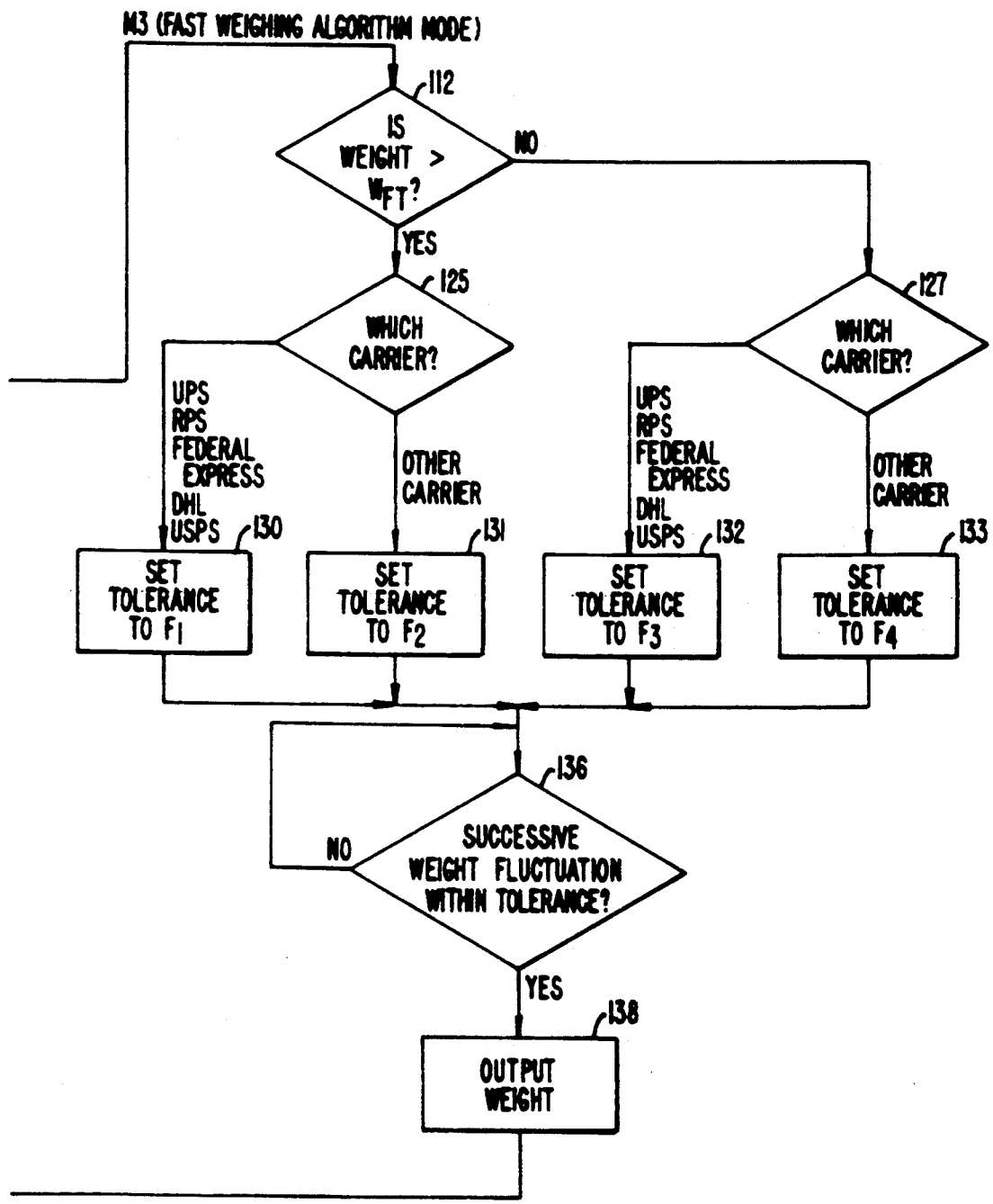

FIG. 2 is an overall flow chart illustrating one embodiment of the software in CPU 20. The functionality described herein will often be carried out in multiple processors in the system, or partially or wholly in discrete logic in the system. A single CPU is illustrated herein for the sake of simplicity.

As shown in FIG. 2, at step 100 the system initializes the software to set various default values, and the like. In one embodiment, the system initializes the mode to a preselected value (preferably the shipping mode). The system operates in this default mode when the user does not strike a mode key. In step 102 the system tests to determine if a mode key is depressed. If so, a variable is set to identify the selected mode is set at step 104. In the particular embodiment shown herein, the variable is set to $M_1$ if key number 14a is depressed, $M_2$ if key number 14b is depressed, and $M_3$ if key 14c is depressed.

If a mode key is not currently depressed, or after setting the mode to the desired value, the system then tests the scale to determine if an article has been placed on the scale at step 106. If an article has not been placed on the scale, the system recycles to step 102. If an article has been placed on the scale the system then proceeds to step 108 (if the mode variable is $M_1$), or step 110 if the mode variable is $M_2$, or step 112 if the mode variable is $M_3$.

If the system moves to step 108, it first determines if the currently indicated weight of the article is greater than some test weight for the first mode, which in the embodiment herein is the shipping mode. This value may be, for example, 5 pounds. If the weight of the article is less than five pounds, the output increment is set to $S_1$ (e.g., 0.1 ounces) at step 114. If the weight of the article is greater than five pounds, the output increment is set to $S_2$ (e.g., 0.5 ounces) at step 116. At step 118, the system then determines if the weight of the article has stabilized to within a weight variability $S_1$ or $S_2$ and, if so, outputs the weight at step 120. If not, the system returns to step 108 and repeats.

A similar process is conducted using different weight increments at steps 122 and 124 if mode $M_2$ has been selected. The same or a different weight stabilization test is then conducted at step 126 using the different increments $C_1$ or $C_2$. After the weight has stabilized the weight is output at step 128, and the system returns to the start step. If the weight has not stabilized to within the increment, the system returns to step 110 and repeats.

If mode $M_3$ (the fast weighing mode) is selected, a slightly different procedure is conducted. After checking the currently indicated weight of the article against the test weight at step 112, the system checks which carrier the user has selected at step 125 or 127, and then sets the tolerance limit to $F_1$, $F_2$, $F_3$ or $F_4$ at step 130, 131, 132 or 133. A weight stabilization test is conducted at step 136. Step 136 is repeated until the successive weight fluctuation is within the tolerance limit. The weight is output at step 138 and the system returns to the start step.

III. Conclusion

The invention provides substantially more flexibility, versatility, and speed in a postage scale system. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system for determining a weight of an article to be mailed comprising:
   (a) a scale; and
   (b) processing means connected to an output of said scale, said processing means having at least a first mode and a second mode of operation selectable by a user, said processing means having a coarse output precision based on said output of said scale in said first mode and a fine output precision based on said output of said scale in said second mode, wherein said processing means adjusts said output precision of said first mode and second mode based on the weight of said article to be mailed, said output of said processing means indicating said weight of an article to be mailed.

2. The system as recited in claim 1 wherein said output of said scale is time varying, said processing means adapted to output said weight of said article to be mailed when said time varying output stabilizes to within substantially said coarse output precision in said first mode and substantially said fine output precision in said second mode.

3. The system as recited in claim 1 wherein at least one of said first and said second mode output weights in accordance with a regulatory standard.

4. The system as recited in claim 1 adapted to display said weight of an article to within about 0.5 ounces in said first mode if said article weighs less than 5 pounds.

5. The system as recited in claim 1 adapted to display said weight of an article to within about 1 ounce in said first mode if said article weights more than 5 pounds.

6. The system as recited in claim 1 adapted to display said weight of an article to within about 0.1 ounces in said second mode when said article weighs less than 5 pounds.

7. The system as recited in claim 1 adapted to display said weight of an article to within about 0.5 ounces in said second mode when said article weighs more than 5 pounds.

8. The system as recited in claim 1 adapted to display said weight of an article in accordance with the following table:

| Weight | Mode | |
| --- | --- | --- |
| | Second | First |
| Less than 5 lb | 0.1 ounce [increments] output precision | 0.5 ounce [increments] output precision |
| Greater than 5 lb | 0.5 ounce [increments] output precision | 1 ounce [increments] output precision |

9. A system for determining a weight of an article to be mailed comprising:
   (a) a scale; and
   (b) processing means connected to an output of said scale, said processing means having at least a first mode and a second mode and a third mode of operation selectable by a user, said processing means having a coarse output precision based on said output of said scale in said first mode and a fine output precision based on said output of said scale in said second mode, said output of said processing means indicating said weight of an article to be mailed, said third mode of operation for automated weighing operations, said third mode of operation having a coarse output precision.

10. The system as recited in claim 9 wherein said processing means is adapted to adjust said coarse output precision to become coarser when a series of articles in said automated weighing operations have weights falling within selected limits.

11. A method of indicating the weight of an article in a postage system comprising the steps of:
   (a) weighing an article;
   (b) inputting a desired mode from a selection of modes from a user, said modes selected from a first, coarse mode and a second, fine mode, each mode having a corresponding output precision;
   (c) from a processing means, outputting said weight in said selected coarse or fine mode for issuance of postage, wherein said processing means adjusts said output precision of said at least first mode and second mode based on the weight of said article.

12. A method as recited in claim 11 further comprising the step of making said output coarser if said article is above a predetermined weight or finer if said article is below a predetermined weight.

13. The method as recited in claim 11 wherein the step of outputting displays weights in accordance with a regulatory standard.

14. The method as recited in claim 11 wherein the step of outputting displays a weight of an article to within about 0.5 ounces in said first mode if said article weighs less than 5 pounds.

15. The method as recited in claim 11 wherein the step of outputting displays said weight of an article to within about 1 ounce in said first mode if said article weighs more than 5 pounds.

16. The method as recited in claim 11 wherein the step of outputting displays said weight of an article to within about 0.1 ounces in said second mode when said article weighs less than 5 pounds.

17. The method as recited in claim 11 wherein the step of outputting displays said weight of an article to within about 0.5 ounces in said second mode when said article weighs more than 5 pounds.

18. The method as recited in claim 11 wherein the step of outputting displays said weight of an article in accordance with the following table:

| Weight | Mode | |
| --- | --- | --- |
| | Second | First |
| Less than 5 lb | 0.1 ounce [increments] output precision | 0.5 ounce [increments] output precision |
| Greater than 5 lb | 0.5 ounce [increments] | 1 ounce [increments] |

19. A method of indicating the weight of an article in a postage system comprising the steps of:
(a) weighing an article;
(b) inputting a desired mode from a selection of modes from a user, said modes selected from a first, coarse mode, a second, fine mode and a third mode of operation for automated weighing operations, said third mode of operation having a coarse mode;
(c) from a processing means, outputting said weight in said selected coarse or fine mode for issuance of postage.

20. The method as recited in claim 19 further comprising the step of adjusting said coarse output precision to become coarser when a series of articles in said automated weighing operations have weights falling within selected limits.

* * * * *